(12) United States Patent
Howard et al.

(10) Patent No.: US 10,938,962 B2
(45) Date of Patent: Mar. 2, 2021

(54) NETWORK ARCHITECTURE FOR MULTIPLE DATA STREAM MANAGEMENT AND ENDPOINT VISUALIZATION

(71) Applicant: Audacious Inquiry, Catonsville, MD (US)

(72) Inventors: Bill Howard, Denver, CO (US); Paul Cahill, North Easton, MA (US); Sandeep Antony, Columbia, MD (US); Scott Afzal, Washington, DC (US); David Horrocks, Baltimore, MD (US)

(73) Assignee: Audacious Inquiry LLC, Catonsville, MD (US)

( * ) Notice: Subject to any disclaimer, the term of this patent is extended or adjusted under 35 U.S.C. 154(b) by 120 days.

(21) Appl. No.: 15/911,137

(22) Filed: Mar. 4, 2018

(65) Prior Publication Data

US 2018/0295217 A1    Oct. 11, 2018

Related U.S. Application Data

(63) Continuation of application No. 15/808,887, filed on Nov. 9, 2017, now abandoned, which is a continuation-in-part of application No. 15/010,142, filed on Jan. 29, 2016, and a continuation-in-part of application No. 14/872,445, filed on Oct. 1, 2015, and a continuation-in-part of application No. 14/445,562, filed on Jul. 29, 2014, now abandoned, and a continuation-in-part of application No. 14/189,225,
(Continued)

(51) Int. Cl.
*H04L 29/06* (2006.01)
*H04L 5/02* (2006.01)
*G06F 3/0484* (2013.01)
*G06F 16/2455* (2019.01)

(52) U.S. Cl.
CPC .......... *H04L 69/06* (2013.01); *G06F 3/04842* (2013.01); *G06F 16/24568* (2019.01); *H04L 5/02* (2013.01); *H04L 69/18* (2013.01)

(58) Field of Classification Search
CPC . H04L 69/06; H04L 5/02; H04L 69/18; G06F 16/24568; G06F 3/04842
See application file for complete search history.

(56) References Cited

U.S. PATENT DOCUMENTS

10,282,791 B2 *  5/2019  O'Neil ............... G06Q 50/01
2003/0233252 A1 * 12/2003 Haskell ............... G06Q 10/10
                                                             705/2
(Continued)

*Primary Examiner* — Chris Parry
*Assistant Examiner* — Adam A Cooney
(74) *Attorney, Agent, or Firm* — Ryan Alley IP (57) ABSTRACT

Network architecture with a plurality of data streams, wherein at least one of the data streams includes data updated in real-time; a plurality of protocol interfaces each connected to at least one of the data streams; a processor coupled with the protocol interfaces; an output interface coupled to a display for showing a graphical user interface; and a memory coupled to the processor including instructions that when executed by the processor, cause the processor to, multiplex a plurality of signals from the plurality of data streams via the protocol interfaces into a single output, wherein the multiplexing is executed based on an identity of the one of the data stream from which the signal originated, and output the single output to the graphical user interface via the output interface.

14 Claims, 9 Drawing Sheets

Related U.S. Application Data filed on Feb. 25, 2014, now abandoned, and a continuation-in-part of application No. 14/142,625, filed on Dec. 27, 2013, now abandoned, which is a continuation of application No. 13/844,332, filed on Mar. 15, 2013, now abandoned.

(56) References Cited

U.S. PATENT DOCUMENTS

| | | | |
|---|---|---|---|
| 2004/0019464 A1* | 1/2004 | Martucci | G06F 19/3462 |
| | | | 702/189 |
| 2004/0059744 A1* | 3/2004 | Duncan | G16H 10/40 |
| 2004/0122707 A1* | 6/2004 | Sabol | G06Q 10/10 |
| | | | 705/2 |
| 2004/0176667 A1* | 9/2004 | Mihai | A61B 5/0002 |
| | | | 600/300 |
| 2006/0173719 A1* | 8/2006 | Kuhn | G06F 19/321 |
| | | | 705/3 |
| 2007/0124310 A1* | 5/2007 | Mathur | G06F 21/6245 |
| 2008/0208618 A1* | 8/2008 | Schoenberg | G06F 19/3456 |
| | | | 705/2 |
| 2009/0112614 A1* | 4/2009 | Guimaraes | G06Q 50/22 |
| | | | 705/2 |
| 2012/0253847 A1* | 10/2012 | Dell'Anno | A61B 5/0022 |
| | | | 705/3 |
| 2014/0278483 A1* | 9/2014 | Antony | G16H 10/60 |
| | | | 705/2 |

* cited by examiner

FIG. 1

Profile – Search Results

| | Unified Landing Page | HOME | Care Profile | CAliPHR | OB Form | Report Dashboard | | USER NAME (SIGN OUT) HELP |
|---|---|---|---|---|---|---|---|---|

New Search

Patient Search

Last Name(Required): [Last Name] — 1725

First Name(Required): [First Name]

Date Of Birth(Required): MM DD YYYY

Gender: ● Male ○ Female

ZipCode: [ ]

SSN: XXX-XX-XXXX

[PATIENT SEARCH]

Patient Search Results

| FIRST | LAST | M.I | SUFFIX | DATE OF BIRTH | CRISP ID | GENDER | ADDRESS | MATCH SCORE |
|---|---|---|---|---|---|---|---|---|
| GILBERT | GRAPE | | | 1984-01-01 | 32199974 | M | 4145 EARL C ADKINS DR. RIVER, WV 26000 | Very Likely |
| GILBERT | GRAPE | | | 1984-01-01 | 32208305 | Male | null null null, null null | Very Likely |
| GILBERT | GREAPE | | | 1984-01-01 | 31131416 | M | 4145 EARL C ADKINS DR. RIVER, WV 26000 | Very Likely |

Profile Full View (3 of 3)

New Search > Modify Search
Patient Care Profile
Patient Name: John X. Smith  Gender: Male  Date of Birth: 04/09/1984

Health Relationships

| Participant Name | Program | Participant Phone | Enroll Date | Disenroll Date | PCP | Care Manager | Care Manager Phone |
|---|---|---|---|---|---|---|---|
| Test Participant 9 | Care Program 1 | 1-800-TEST-NUM | 2/1/2014 | 2/1/2016 | Eden, Robert | Mary Yoo | 412-410-4300 |
| Test Participant 7 | Care Program 1 | 1-800-TEST-NUM | 2/1/2014 | 2/1/2016 | Eden, Robert | Mary Yoo | 443-410-4300 |
| Test Participant 6 | Care Program 1 | 1-800-TEST-NUM | 2/1/2014 | 2/1/2016 | Eden, Robert | Mary Yoo | 412-410-4300 |
| Test Participant 5 | Care Program 1 | 1-800-TEST-NUM | 2/1/2014 | 2/1/2016 | Eden, Robert | Mary Yoo | 443-410-4300 |
| Test Participant 4 | Care Program 1 | 1-800-TEST-NUM | 2/1/2014 | 2/1/2016 | Eden, Robert | Mary Yoo | 443-410-4300 |
| Test Participant 3 | Care Program 1 | 1-800-TEST-NUM | 2/1/2014 | 2/1/2016 | Eden, Robert | Mary Yoo | 443-410-4300 |
| Test Participant 2 | Care Program 1 | 1-800-TEST-NUM | 2/1/2015 | 2/1/2016 | Eden, Robert | Mary Yoo | 443-410-4300 |
| Test Participant 1 | Care Program 1 | 1-800-TEST-NUM | 2/1/2014 | 2/5/2015 | Eden, Robert | Mary Yoo | 443-410-4300 |

| | | | | | | | 7/16/2012 | 7/20/2012 | NURSING UNLIMITED SERVICES, INC. | Personal care services, per 15 minutes, not for an inpatient or resident of a hospital, nursing facility, ICF/MR or IMD, part of the individualized plan of treatment (code may not be used to identify services provided by home health aide or certified nurse assistant) home health aide or certified nurse assistant) |
| | | | | | | | 7/16/2012 | 7/20/2012 | NURSING UNLIMITED SERVICES, INC. | Personal care services, per 15 minutes, not for an inpatient or resident of a hospital, nursing facility, ICF/MR or IMD, part of the individualized plan of treatment (code may not be used to identify services provided by home health aide or certified nurse assistant) |
| | | | | | | | 7/16/2012 | 7/20/2012 | NURSING UNLIMITED SERVICES, INC. | Personal care services, per 15 minutes, not for an inpatient or resident of a hospital, nursing facility, ICF/MR or IMD, part of the individualized plan of treatment (code may not be used to identify services provided by home health aide or certified nurse assistant) |
| | | | | | | | 7/16/2012 | 7/20/2012 | NURSING UNLIMITED SERVICES, INC. | Personal care services, per 15 minutes, not for an inpatient or resident of a hospital, nursing facility, ICF/MR or IMD, part of the individualized plan of treatment (code may not be used to identify services provided by home health aide or certified nurse assistant) |
| | | | | | | | 6/13/2012 | 6/13/2012 | HUH DENTAL CARE | |
| | | | | | | | 5/16/2011 | 5/16/2011 | BRIAN PROVIDER | |
| | | | | | | | 4/9/2010 | 4/9/2010 | HILLCREST CHILDRENS CENTER | Chronically psychosocial supportive treatment, face-to-face, per 15 minutes |
| | | | | | | | 4/9/2013 | 4/12/2013 | NURSING UNLIMITED SERVICES, INC. | Services at home health/hospice side in home health or hospice setting, each 15 minutes |

Encounters from Claims

● Event

| 2008 | 2010 | 2011 | 2012 | 2013 | 2014 | 2015 |

CAliPHR Tab

*Measure Detail Screen*

1700

CMS122v4
Diabetes: Hemoglobin A1c Poor Control

Sub-measure Title
Description             Percentage of patients 18-75 years of age with diabetes who had hemoglobin A1c > 9.0% during the measurement period.
                        Read less Guidance                Patient is numerator compliant if most recent HbA1c level >9%, the most recent HbA1c result is missing, or if there are no HbA1c tests performed and results documented during the measurement period. Only patients with a diagnosis of Type 1 or Type 2 diabetes should be included in the denominator of this measure; patients with a diagnosis of secondary diabetes due to another condition should not be included.
                        Read less Stratification          None Initial Population   Numerator   Denominator   Care Gaps

Denominator Criteria:
Equals Initial Population

| Last Name     | First Name     | Gender | DOB          |
|---------------|----------------|--------|--------------|
| M Adult DM    | ?              | M      | Sep 04, 1969 |
| N Heart       | 5              | M      | Jan 11, 1952 |
| A             | Diabetes_Adult | F      | Feb 01, 1985 |
| B             | Diabetes_Adult | F      | Feb 01, 1985 |

Results: 1 - 4 / 4         Limit:  10      <   1 / 1   >

NETWORK ARCHITECTURE FOR MULTIPLE DATA STREAM MANAGEMENT AND ENDPOINT VISUALIZATION

BACKGROUND

Related art network hub infrastructure often includes processors and related transient memory and/or cache connected with one or more servers and network-side databases under its control. The servers, or potentially ports or other types of interfaces, at the hub communicatively connect to one or more spoke data sources or streams for the hub. For example, a network hub may connect to third-party hosts, other databases, and/or services that provide signals to the network hub. Each of these spoke data sources may require unique signal management, authentication, and/or communications protocol, for which each server, port, or other hub-side interface must be configured, either with hardware matching and satisfying the protocol and/or software configured to provide hub-side authentication, interaction, and data-management with the sources and streams.

Dynamic third-party spokes provide information or services that may change or be updated over time, potentially in real-time for data to match current physical conditions or occurrences. For example, a spoke relational database may update read-only-memory in real-time with new or updated entries as detected physical characteristics change, updated calculations are completed, and/or new data becomes available. Or, for example, a spoke third-party service may return new signals in response to hub-side server queries. Or, for example, a spoke data stream may transmit information in real-time as generated or received, such as network status, client interactions, processor actions, etc. These dynamic network spokes require the hub processor to concomitantly handle dynamic signal input in multiples equal to spoke number, often requiring hub processing power to exceed that of any spoke service.

On the other side of the network hub, servers, or potentially ports or other types of interfaces, communicatively connect to one or more spoke clients or users. The same types of configuration for protocol, authentication, data management, etc. with regard to spoke clients and users must be implemented at the hub for each spoke client. The hub may act as a simple multiplexor feeding signals from each spoke data source to each spoke client in composite or multiplexed fashion. Similarly, information may be aggregated in a hub-side database and analyzed for retrieval by spoke clients, potentially through operator or processor query from client members in the network. In the instance of data streams, the network architecture may provide continuous signals to clients in visual or formatted fashion so that operators at client spokes may more easily display, such as through light signals emanating from a substrate surface forming a GUI, and consume all data incoming from potentially several spoke data streams.

Examples of related art network architectures handling data streams in real time and/or from multiple spoke-side sources having heterogenous configurations can be found in U.S. Pat. No. 9,800,608 to Korunsky et al.; U.S. Pat. No. 9,437,022 to Vander Broek; U.S. Pat. No. 9,348,876 to Paranjpe et al.; and U.S. Pat. No. 9,083,770 to Drose et al., all of which are incorporated herein in their entireties.

SUMMARY

Example embodiments include a network architecture with a plurality of data streams, wherein at least one of the data streams includes data updated in real-time; a plurality of protocol interfaces each connected to at least one of the data streams; a processor coupled with the protocol interfaces; an output interface coupled to a display for showing a graphical user interface; and a memory coupled to the processor including instructions that when executed by the processor, cause the processor to, multiplex a plurality of signals from the plurality of data streams via the protocol interfaces into a single output, wherein the multiplexing is executed based on an identity of the one of the data stream from which the signal originated, and output the single output to the graphical user interface via the output interface, wherein the graphical user interface includes a plurality of fields, and wherein the single output populates at least one of the fields based on the identity of the one of the data stream in real-time.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 2 is an illustration of a profile screen of an example embodiment graphical user interface (GUI).

FIG. 6 is an illustration of a third page of the multiple-field screen of the example embodiment GUI.

DETAILED DESCRIPTION

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any structural or functional difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The inventors have recognized that data streams are often operated and controlled by disparate organizations and entities operating under different communications protocols and having distinct information interfaces. As such, no single network is able to aggregate and combine all information from the various streams, which may be dynamic and change in real time, into a single output that interrelates all relevant data for a operator query or parameter. Thus, there is a need for a network architecture that can interface with multiple data streams operating on distinct protocols and offering different but related data and provide the same through a single output interface. To overcome these newly-recognized problems as well as others, the inventors have developed example embodiments and methods described below to address these and other problems recognized by the Inventors with unique solutions enabled by example embodiments.

The present invention is a network architecture presenting a graphical user interface with multiple endpoints populated with content from disparate data streams. In contrast to the present invention, the few example embodiments and example methods discussed below illustrate just a subset of the variety of different configurations that can be used as and/or in connection with the present invention.

Figure 1:
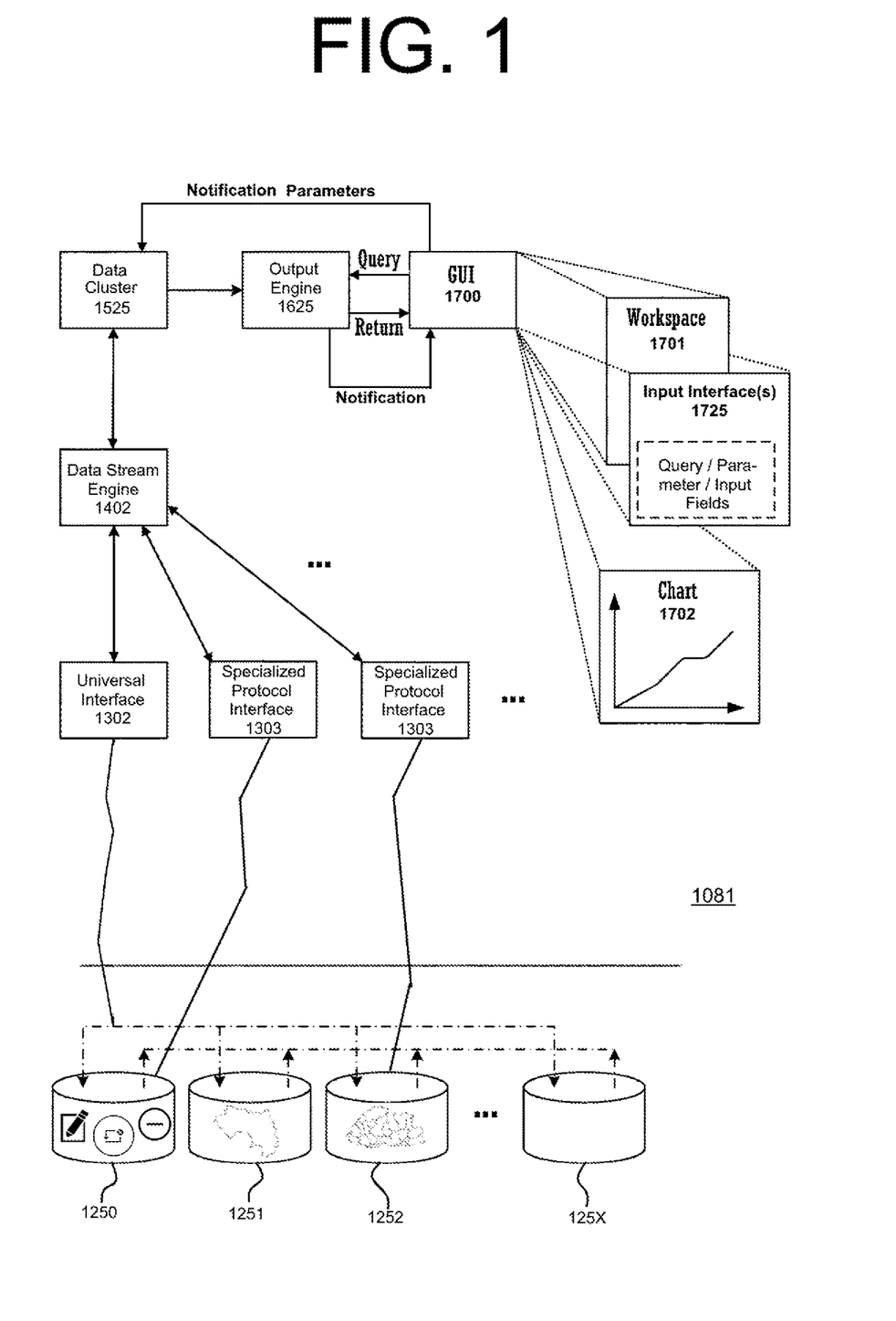
FIG. 1 is an illustration of an example embodiment network architecture.

FIG. 1 depicts an example embodiment network architecture 1081. As shown in FIG. 1, several different data sources and/or streams 1250, 1251, 1252, etc. provide signals carrying various types of information, potentially updated in real time. Stores in data streams 1250, 1251, 1252, etc. may be interrelated, with arrows showing each stream potentially providing signals to and updating portions or partitions in other stores in other streams, all or any of which may be communicatively connected. For example, a live feed from data stream 1252 may be updated in relevant portion into another stream 1250, or data stream 1251 could be a universal store, for example, aggregating all entries and database updates from each other data store. Various information sources interact and intercommunicate within streams 1250, 1251, 1252, etc., for example, over networks disposed therewith. The streams may include any of a variety of data producers, exchangers, and consumers.

Multiple interfaces 1302, 1303, etc. receive and analyze signals carrying information from data streams 1250, 1221, 1252, etc. to which interfaces communicatively connect. Universal interface 1302 may intercept, receive, and analyze all signals generated and passed among all streams and potentially identify and analyze relevant data across several different types of sources and protocols. Universal interface 1302 may be configured with several protocols and test, or sample, signals and output from data streams 1250, 1251, 1252, etc. to determine an operating protocol and properly interface and analyze data in the protocol. Specialized protocol interface 1303 may operate in accordance with a specific protocol including data format, connection type, encryption type, and communications standards. In this way example network 1081 is capable of communicatively connecting to and interfacing with several different types of data streams 1250, 1251, 1252, etc. and parsing signals and information from the same.

Data stream engine 1402 multiplexes or otherwise aggregates incoming signals or extracted data from interfaces 1302, 1303, etc. Data stream engine 1402 may convert or adapt signals based on protocol to a universal or otherwise processable state. For instance, data stream engine 1402 may be programmed and interfaced with a specialized protocol of interfaces 1303 or adapt to the protocol detected by universal interface 1302. In this way data stream engine 1402 may control or be able to configure signal portions and connection type with interfaces 1302, 1303 etc., and vice versa, in order to achieve full communicative connection. Data stream engine 1402 may thus receive and process real-time signals from several data sources and provide the same to data cluster 1525.

Data cluster 1525 includes at least one hardware processor and associated memory such as a cache, transient memory, and read-only memory, as well as necessary busses and input/output ports, up to potentially several server farms and multiple processors working in parallel. Storage in cluster 1525 may be a dedicated drive or may be a partition of a general larger farm or cloud in which relevant information from streams 1250, 1251, 1252, etc. and/or device operations and raw data can be saved. This may be, for example, random access memory, read only memory, programmable read only memory, erasable programmable read only memory, electronically erasable programmable read only memory, flash memory, a hard disk, a processor cache, optical media, and/or other non-transient computer readable media.

Data cluster 1525 may categorize, organize, store, and/or retrieve real-time and requested data provided from data stream engine 1402 as well as previously-stored information. Data cluster 1525 may also control retrieval or querying of data streams 1252 acting as data sources by engine 1402 and/or interfaces 1302, 1303, etc. In this way, data cluster 1525 may receive, monitor, and/or request any type of data from local or remote data stores for single-line network processing and analysis.

Data cluster 1525 determines a destination, or endpoint, of received and analyzed signal based on the determined data content and well as member/client input, such as in the form of notification parameters. Data cluster 1525 may also be configured to store or dispose a portion of the signals and information received based on data content and client input. That is, data cluster 1525 is configured to both filter and direct output signals from multiple diverse data streams based on several parameters, potentially in real-time. Signals and data for output may be provided to output engine 1625 along with endpoint control, including for example, a computer IP or MAC address, I/O identifier, or other direction.

Output engine 1625 may format the output signal in accordance with the endpoint. For example, output engine 1625 may include graphical instruction or depictions for portions of GUI 1700 as an endpoint. Output engine 1625 may include a server or other interface for a third-party operator of GUI 1700 in order to connect and output relevant signals for endpoint arrangement. In one example, data streams 1250, 1252, and 1252 may be HL7 or CCDA configured networks, including an HIE and encounter facilities, generating and storing numerous records and EHR signals, for which protocols specialized protocol interface 1303 may be configured and connected in standard-specific ways. US Patent Publications to Antony et al. 2014/0278483; 2015/0242574; 2015/0242568; 2015/0242569; 2016/0034641; 2017/0098043; and 2017/0220742 all describe further example configurations for example embodiment network architecture 1081 and specific graphical returns that may be displayed on GUI 1700 and are incorporated herein by reference in their entireties.

GUI 1700 may display graphical output from output engine 1625 in specific fields, surfaces, places, and manners as dictated by cluster 1525 and engine 1625. GUI 1700 may include several specific endpoints itself for particular data, including workspace 1701, input interface 1725, and graphical charts 1702. Workspace 1701 may render specific data directed to different fields in appropriate forms, such as via drop-down menus, pop-up menus, line or a radio button, text input field etc. for input interface 1725, into which an operator may enter a query or control command. Based on the query or in response to a satisfied notification parameter provided by the user, output engine 1625 returns a response for display on GUI 1700 in an appropriate surface field, such as chart 1702 or as a table for numerical data. In this way, numerical data may be rendered in GUI 1700 as interactive tables, graphical data as interactive charts 1702, alert or notification data as pop-ups or prompt icons updating the tables and charts, etc. Each of these displays may be in separate fields based on their data stream origin and information type, as determined and controlled by data cluster 1525 and output engine 1625.

FIG. 2 is an illustration of an example embodiment GUI 1700 showing one screen or collection of fields as different endpoints with origin-specific contents. As seen in FIG. 2, several navigation sections 1741, 1742, 1743, 1744, and 1745 may be displayed on a single surface, allowing an operator to select, click, enter, or otherwise navigate to different sections as operator input. FIG. 2 shows example embodiment GUI 1700 with "Care Profile" navigation section 1742 selected with corresponding workspace 1701 graphically displayed on GUI 1700. In workspace 1701, search results field 1730 is shown, responsive to on-screen entry in input interface 1725. Data cluster 1525 (FIG. 1) may direct output engine 1625 (FIG. 1) to return a list of matching search results from a connected memory or data stream for a particular query, including near matches and matches with related and partial data field entry matches, which is selectively displayed in field 1730 as an endpoint, only based on the nature of the returned values. GUI 1700 may also support authentication or operator login operation and identification through login selection 1750 in order to determine access to particular data streams and contents thereof.

Figure 3:
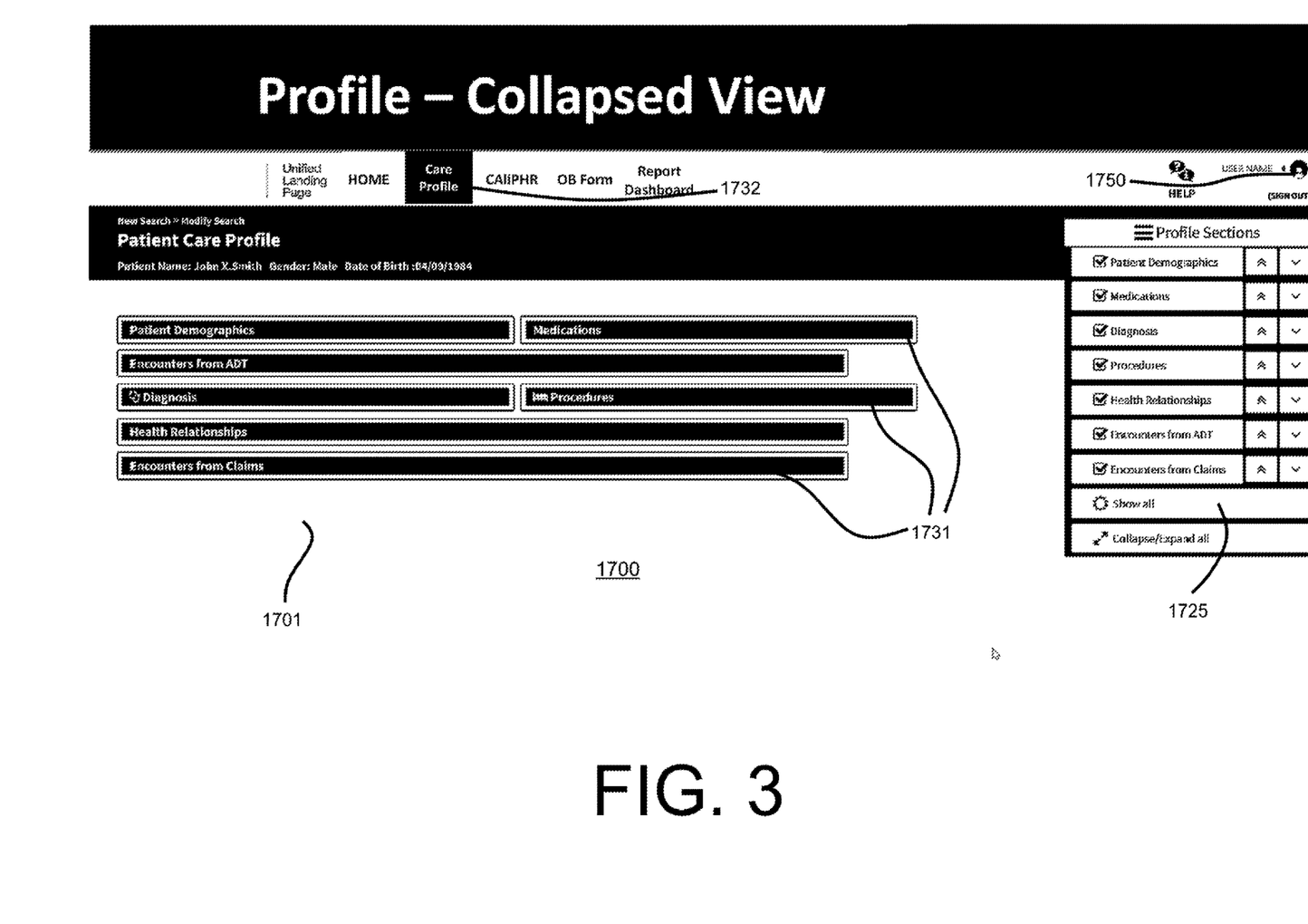
FIG. 3 is an illustration of a selected profile screen of the example embodiment GUI.

FIG. 3 is an illustration of an example embodiment GUI 1700 showing a next screen or collection of fields as different endpoints with origin-specific contents. As seen in FIG. 3, upon selection from field 1730 in FIG. 2, several different expandable profile options 1731 may be displayed for the selection. Another input field 1725 may allow an operator to select which profile options 1731 to display for any particular selection. Each option 1731, if expanded and/or selected, may display a selective field within GUI 1700 as a particular endpoint controlled by cluster 1525 and engine 1625; that is, cluster 1525 may select, format, and display contents in an expanded field under a selected option 1731 as an endpoint from only a single associated data stream 125X (FIG. 1). Or, for example, an operator may input a "show all" option and "Expand all" option in input field 1725, displaying GUI 1700 with the screens of FIGS. 4-6.

Figure 4:
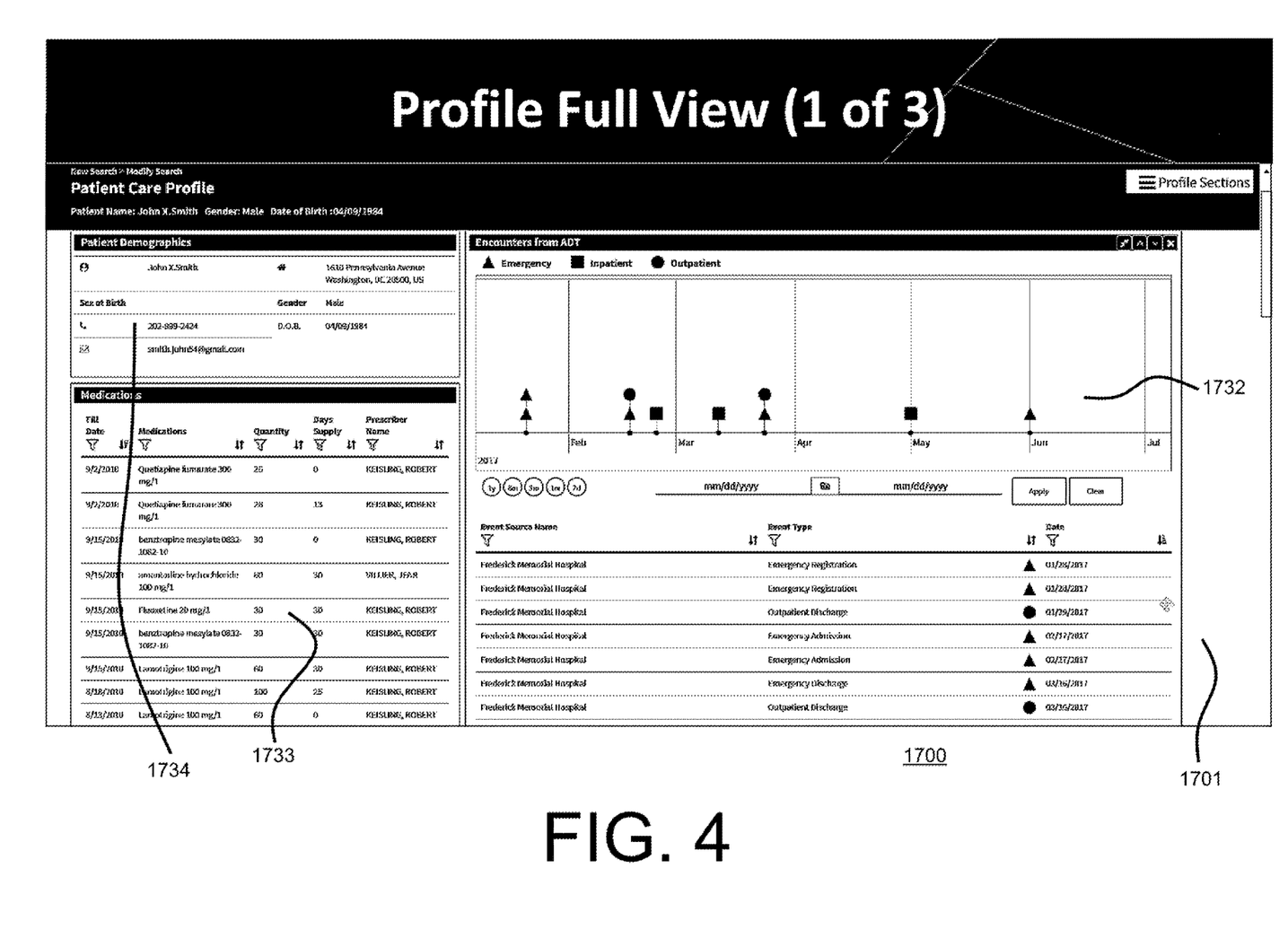
FIG. 4 is an illustration of a multiple-field screen of the example embodiment GUI.

As shown in FIG. 4, example embodiment GUI 1700 may include several different endpoint fields 1734, 1733, and 1732. For example, endpoint field 1732 may graphically display one set of input updated in real-time for a historical period from a one data stream 1250, and endpoint field 1734 may display a static input set from another data stream 1251 operating on potentially different protocols and interfaces. For example, endpoint field 1732 may update with filtered, real-time HL7 signals and messages of a particular type responsive to an operator's parameters for a selected option from FIG. 2, while endpoint field 1734 may display a table retrieved from an HIE, all based on origin as determined from interfaces 1302, 1303, etc. and data stream engine 1402 (FIG. 1). A further endpoint field 1733 may display additional results associated with data displayed in field 1732 from yet another stream or source.

Figure 5:
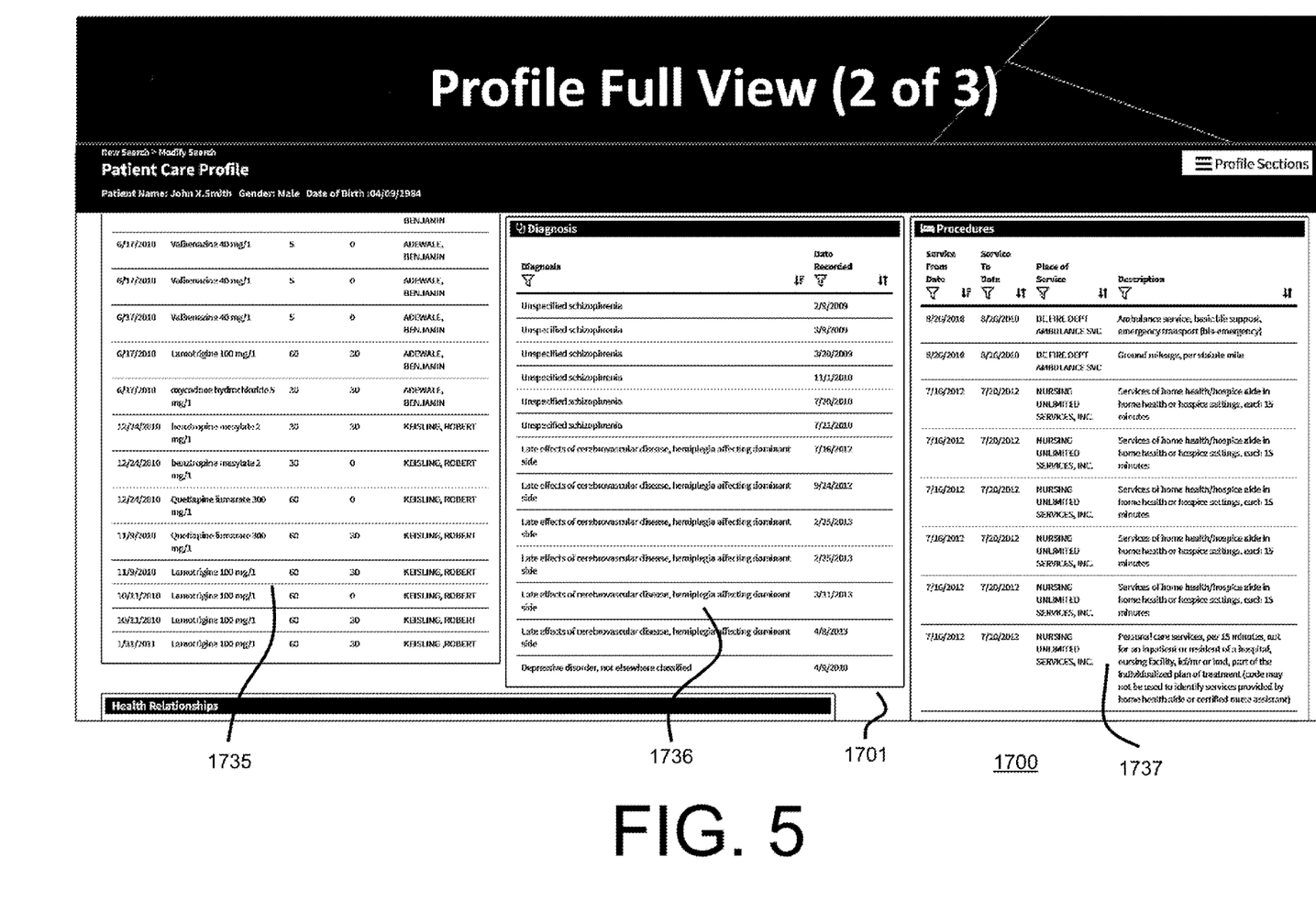
FIG. 5 is an illustration of a second page of the multiple-field screen of the example embodiment GUI.

As shown in FIG. 5, a second page of example embodiment GUI 1700 may include further endpoints 1735, 1736, and 1737 in workspace 1701, displaying further contents from different streams that correlate with a selected option. FIG. 6 illustrates a third page continuing endpoint 1737 along with new endpoints 1738 and 1739 each having potentially unique data stream sources updated in real time. Different pages of FIGS. 4-6 may be viewed by scrolling or clicking "next page" options in example embodiment GUI 1700.

As seen in FIGS. 2-6, example embodiment GUI 1700 may display several different pieces of data, notification, and query results in a single graphical user interface with several different fields having related contents aggregated from several different data streams. Some endpoints in GUI 1700, such as endpoint field 1733, may be tabular with sortable headings and columns having data drawn from one data stream, and other endpoints, such as chart endpoint 1732, may be dynamic graphical representations of related data from a different source. In this way, example embodiment network architecture 1081 may connect to and interface with several distinct data streams from different owners and operators having related data and aggregate the same into a single GUI 1700, with different fields being populated based on stream origin, data type, and operator queries or parameters.

Figure 7:
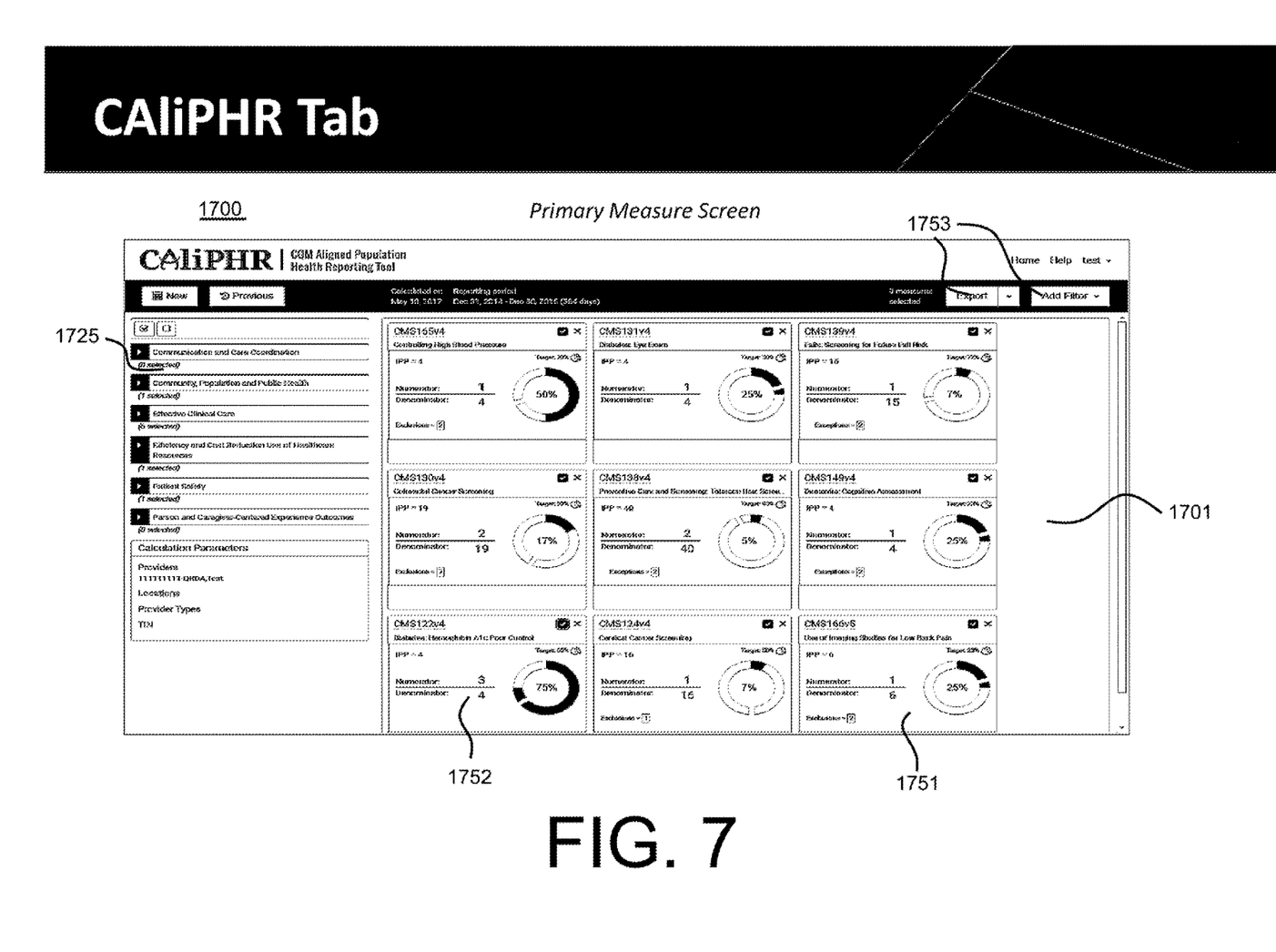
FIG. 7 is an illustration of a selected analytics multiple-pane screen of the example embodiment GUI.

FIG. 7 is an illustration of example embodiment GUI 1700 upon selection of navigation section 1743 for "CAliPHR" from FIG. 2. As seen in FIG. 7, several analytics panes 1751 and 1752 in FIG. 2 are displayed in workspace 1701. In the example of FIG. 7, several different conditions responsive to a time period and provider input through input field 1725 are displayed. Graphical user interface 1700 may display analyzed data created and retrieved by data cluster 1525 from multiple data streams 125X in a single workspace 1701. Both graphical elements and raw data may be presented in individual panes. For example, for readmissions or other outcomes as a percentage of a selected facility's total population, one pane 1752 may graphically show values associated with a first condition, while another pane 1751 may graphically show values associated with a second condition. As seen in FIG. 7, one or more display controls 1753 may allow the operator to export underlying data in raw, compressed, or tabulated format as well as add additional filters to display subgroups of panes 1751, 1752, etc.

Figure 8:
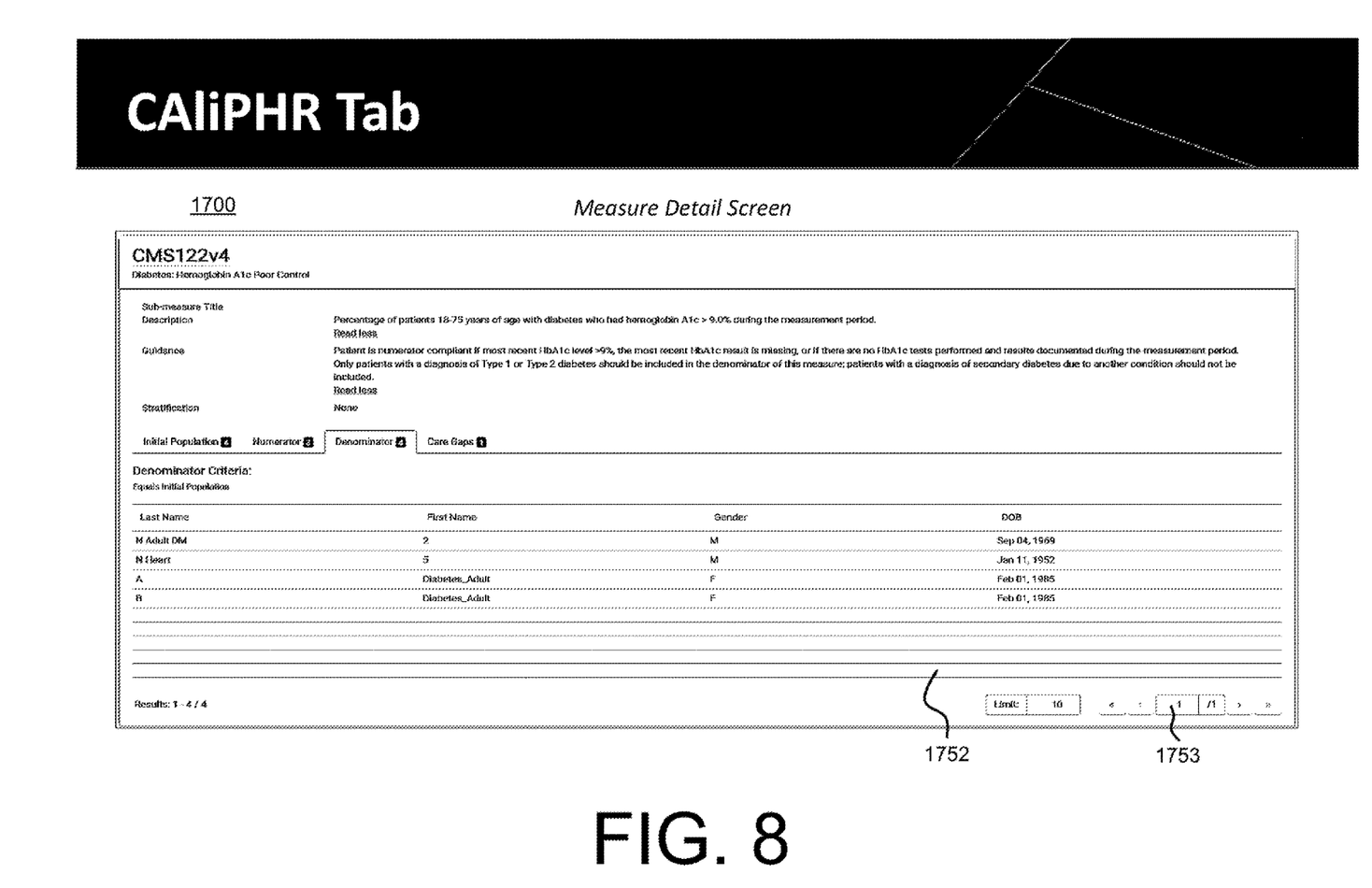
FIG. 8 is an illustration of a selected pane screen of the example embodiment GUI.

As seen in FIG. 8, selecting, such as by clicking, on pane 1752 presents an expanded view of additional data associated with the condition, potentially from additional data streams. The user may move through tabs organizing the expanded contents by subject matter as well as interact with tools 1753 to move to next panes, last panes, etc. Similarly, a user may export or save data from expanded view of pane 1752 in example embodiment GUI 1700.

Figure 9:
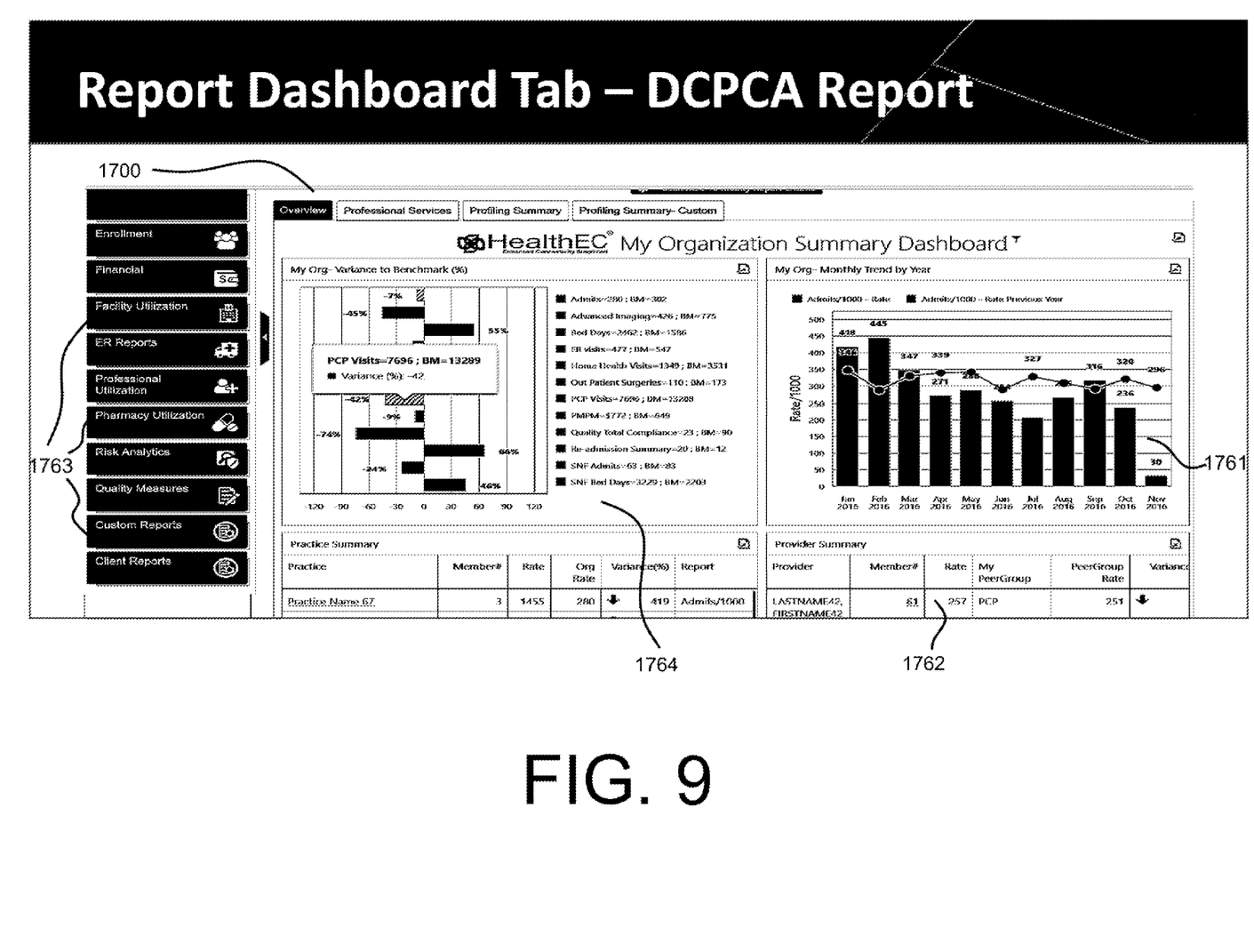
FIG. 9 is an illustration of a third-party output screen of the example embodiment GUI.

As shown in FIG. 2, through navigation selection 1745 for "Report Dashboard" example embodiment GUI 1700 may display third-party reports retrieved from different data streams and display them on the page shown in FIG. 9, which is an example third-party display page in GUI 1700. For example, as shown in FIG. 9, a third-party data stream may offer analysis services with directly output graphical analysis in chart panes 1761 and 1764 as well as tabular data in sortable table pane 1762, responsive to report selections 1763 activated by a user. Cluster 1525 may directly access and output the graphical and tabular elements in GUI 1700 of FIG. 9 through an appropriate interface 1303 that interacts with the third-party service providing the graphics and tables. In this way, example embodiment architecture 1081 (FIG. 1) may provide for a singular GUI 1700 with direct third-party applications and outputs as a workspace 1701.

As seen in FIGS. 2-9, example embodiment network architecture 1801 of FIG. 1 may thus gather and discriminate among several different types and number of data streams 125X providing dynamic or static data under several different operating standards and protocols, adapt the same for a single-stream output through output engine 1625, and display the various pieces of data, analysis thereof, graphical elements, and tabular values in a single GUI 1700 with user-friendly, navigable interfaces on a screen or through an operator input device. Different types of data from different sources may be populated into different on-screen fields based on their origin as determined by data cluster 1525. Moreover, analysis, filtering, and other data handling of potentially otherwise separately owned and operated information can be graphically gathered together on GUI 1700 for comprehensive analysis by an operator.

Signals including data for selective endpoint display, in each of the network components, means, modules, mechanisms, units, devices etc. of example network architecture 1081 may be 'encrypted' and suitably 'decrypted' when required. Encryption can be accomplished using any encryption technology, such as the process of converting digital information into a new form using a key or a code or a program, wherein the new form is unintelligible or indecipherable to a user or a thief or a hacker or a spammer. The term 'encryption' includes encoding, compressing, or any other translating of the digital content. The encryption of the digital media content can be performed in accordance with any technology including utilizing an encryption algorithm. The encryption algorithm utilized is not hardware dependent and may change depending on the digital content. For example, a different algorithm may be utilized for different websites or programs. The term 'encryption' further includes one or more aspects of authentication, entitlement, data integrity, access control, confidentiality, segmentation, information control, and combinations thereof.

Example embodiment network architecture 1081 can be made accessible through a portal or an interface which is a part of, or may be connected to, an internal network or an external network, such as the Internet or any similar portal. The portals or interfaces are accessed by one or more of users through an electronic device, whereby the user may send and receive signals to the portal or interface which gets stored in at least one memory device or at least one data storage device or at least one server. The configuration described herein may be optionally executed from functional data structures on one or more of a non-transitory, computer readable medium, in relation with, and in combination with such pieces of hardware. Such executable configurations may manifest as a website, an executable software program, or a software application. A non-transitory, computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.).

An operator may provide user input through any suitable input device or input mechanism such as but not limited to a keyboard, a mouse, a joystick, a touchpad, a virtual keyboard, a virtual data entry user interface, a virtual dial pad, a software or a program, a scanner, a remote device, a microphone, a webcam, a camera, a fingerprint scanner, a cave, pointing stick, etc. Communicative connections and control among network structures may use Bluetooth, Wi-Fi, Wimax, near-field communications, optical signals, etc.

Actions throughout example embodiment network architectures may include user authentication, data verification, privacy controls, and/or content screening. This will also extend to use an authentication key or access key or electronic device based unique key or any combination thereof. In this way, one or more operators can be blocked or denied access to one or more of the aspects of the invention. For example, operators may never be provided with identifying information of the one another, such that a party creating entries in a data stream and/or a party consuming the same through GUI 1700 may remain anonymous to the other. Data may be encrypted and not retained at one or all points in example methods, such that there may be no discoverable record of signals from data streams 125X, independent media, origin and/or limitation information in regard to such content, existence, performance, etc. As to verification, example methods may take advantage of an operator login model requiring user authentication with a password over a secured connection and/or using operating-system-native security control and verification on communications devices, to ensure only verified, permitted operators gain access. Example embodiment network architectures may also require payment verification, such as credit card or bank account authentication, to verify identity and/or ability to pay before allowing access and may use location and input verification available through operating system controls or other network functionalities, potentially in combination with user feedback, to prevent or punish location spoofing, user account compromising, bot access, and/or harassment or waste.

Some examples described here, it is understood that one or more example methods may be used in combination and/or repetitively to produce multiple options and functionalities for operators of networks connected among several different types of streams and sources for differing signals through proper computer programming or hardware configuring of networks and communications devices to perform example selective endpoint display on example embodiment GUIs, at any number of different processor-based devices that are communicatively connected.

Example methods and embodiments thus being described, it will be appreciated by one skilled in the art that example embodiments may be varied through routine experimentation and without further inventive activity. Variations are not to be regarded as departure from the spirit and scope of the exemplary embodiments, and all such modifications as would be obvious to one skilled in the art are intended to be included within the scope of the following claims.

What is claimed is:

1. A network comprising:
   a plurality of data streams, wherein at least one of the data streams includes data updated in real-time, wherein the plurality of data streams include HL7 Admit, Transfer, Discharge (ADT) Messages;
   a plurality of protocol interfaces each connected to at least one of the data streams, wherein at least one of the protocol interfaces is configured for HL7;
   a processor coupled with the protocol interfaces;
   an output interface coupled to a display for showing a graphical user interface; and
   a memory coupled to the processor including instructions that when executed by the processor, cause the processor to,
   multiplex a plurality of signals from the plurality of data streams via the protocol interfaces into a single output, wherein the multiplexing is executed based on an identity of the one of the data stream from which the signal originated,
   dispose a portion of the HL7 ADTs based on content of the HL7 ADTs and client input, and
   output the single output to the graphical user interface based on the content and the client input via the output interface, wherein the graphical user interface includes a plurality of fields, and wherein the single output populates at least one of the fields based on the identity of the one of the data stream in real-time.

2. The network of claim 1, wherein the graphical user interface includes input fields for an operator, and wherein the instructions further cause the processor to,
   receive input from the operator,
   populate the at least one field with a different portion of the single output based on the input, and
   reformat the at least one field based on the input.

3. The network of claim 1, wherein the instructions further cause the processor to,
   discard other data from the HL7 system.

4. The network of claim 1, wherein the graphical user interface includes a plurality of selectable panes presenting graphical and value data, and wherein the instructions further cause the processor to,
   receive a selection of one of the panes, and
   reformat the graphical user interface to display only the selected page with additional related value data from at least two of the data streams.

5. The network of claim 1, wherein the graphical user interface includes one of a user-interactive table and a user-interactive chart.

6. The network of claim 1, wherein at least one of the data streams provides a dynamic graphical element, and wherein the instructions further cause the processor to,
   directly display the dynamic graphical element in the graphical user interface.

7. The network of claim 1, wherein the plurality of data streams each operates under a different standard and provides a different data type.

8. The network of claim 1, wherein the single output includes composite data generated from a plurality of signals output by different data streams of the plurality of data streams.

9. The network of claim 1, wherein the graphical user interface is configured to be visually displayed on a single surface screen and interacted with via touchpad.

10. A network comprising:
    a plurality of data sources operating on different protocols, wherein the plurality of data sources include HL7 Admit, Transfer, Discharge (ADT) Messages;
    a plurality of protocol interfaces each connected to at least one of the data sources, wherein at least one of the protocol interfaces is configured for HL7;
    a processor coupled with the protocol interfaces;
    an output interface coupled to a display for showing a graphical user interface; and
    a memory coupled to the processor including instructions that when executed by the processor, cause the processor to,
    aggregate output from the data sources via the protocol interfaces into a single output
    dispose a portion of the HL7 ADTs based on content of the HL7 ADTs and client input, and
    output the single output based on the content and the client input to the graphical user interface via the output interface, wherein the graphical user interface includes a plurality of fields, and wherein the single output populates at least one of the fields with portions of the single output.

11. The network of claim 10, wherein the instructions further cause the processor to,
    discard other data from the HL7 system.

12. The network of claim 10, wherein the graphical user interface includes a plurality of selectable panes presenting graphical and value data, and wherein the instructions further cause the processor to,
    receive a selection of one of the panes, and
    reformat the graphical user interface to display only the selected page with additional related value data from at least two of the data sources.

13. The network of claim 10, wherein the graphical user interface includes one of a user-interactive table and a user-interactive chart.

14. The network of claim 10, wherein at least one of the data streams provides a dynamic graphical element, and wherein the instructions further cause the processor to,
   directly display the dynamic graphical element in the graphical user interface.

\* \* \* \* \*